United States Patent
Albers et al.

(10) Patent No.: US 11,214,952 B2
(45) Date of Patent: Jan. 4, 2022

(54) SYSTEM FOR TREATMENT OF WATER

(71) Applicant: NAUTILUS VENTURES IPCO INC., Calgary (CA)

(72) Inventors: Cory Albers, Calgary (CA); Bernard Amell, Calgary (CA)

( * ) Notice: Subject to any disclaimer, the term of this patent is extended or adjusted under 35 U.S.C. 154(b) by 97 days.

(21) Appl. No.: 16/633,130

(22) PCT Filed: Jul. 25, 2018

(86) PCT No.: PCT/CA2018/050896
§ 371 (c)(1),
(2) Date: Jan. 22, 2020

(87) PCT Pub. No.: WO2019/018930
PCT Pub. Date: Jan. 31, 2019

(65) Prior Publication Data
US 2020/0149262 A1 May 14, 2020

Related U.S. Application Data

(60) Provisional application No. 62/538,541, filed on Jul. 28, 2017.

(51) Int. Cl.
*E03F 5/10* (2006.01)
*C02F 1/00* (2006.01)
(Continued)

(52) U.S. Cl.
CPC .............. *E03F 5/103* (2013.01); *C02F 1/004* (2013.01); *C02F 3/327* (2013.01); *E03F 1/00* (2013.01);
(Continued)

(58) Field of Classification Search
CPC ..... E03F 1/00; E03F 5/10; E03F 5/103; E03F 5/14; C02F 3/32; C02F 3/327; E03B 3/04
(Continued)

(56) References Cited

U.S. PATENT DOCUMENTS 4,209,388 A * 6/1980 DeFraites ................. C02F 3/32
 210/170.09
5,993,649 A * 11/1999 DeBusk .................... C02F 3/32
 210/602
(Continued)

FOREIGN PATENT DOCUMENTS

CA 2977268 3/2018
CN 104230099 12/2014

OTHER PUBLICATIONS

International Search Report received in corresponding PCT Application No. PCT/CA2018/050896, dated Sep. 27, 2018, 3 pages.
(Continued)

*Primary Examiner* — Christopher Upton
(74) *Attorney, Agent, or Firm* — Parlee McLaws LLP; Susan Rancourt

(57) ABSTRACT

Surface water, such as stormwater, is contained in a pond, or other containment having primary semi-isolated treatment areas constructed, or designated therein, which are suitable for establishing ecological communities for treatment of water within the containment. Water for treatment is induced to flow through the semi-isolated areas and the ecological communities therein for treating the water, such as by bio-filtering, breakdown and bioremediation of water-soluble or hydrocarbon-based contaminants and inhibition of the proliferation of waterborne pathogens. The treated water is then discharged from the semi-isolated areas, such as for use downstream. Discharge of the treated water from the primary semi-isolated treatment areas, as well as the use of pump systems, induces the flow of water through the semi-isolated areas and ecological communities therein to effect the treatment. Ecological communities may be established in relatively shallow secondary treatment areas in the
(Continued)

containment and the recirculation of water therethrough may further act to treat the water in the containment.

26 Claims, 5 Drawing Sheets

(51) Int. Cl.
*C02F 3/32* (2006.01)
*E03F 1/00* (2006.01)
*E03F 5/14* (2006.01)

(52) U.S. Cl.
CPC .......... *E03F 5/14* (2013.01); *C02F 2301/046* (2013.01); *C02F 2301/08* (2013.01)

(58) Field of Classification Search
USPC .......... 210/602, 747.1, 747.2, 747.3, 170.01, 210/170.03, 170.09
See application file for complete search history.

(56) References Cited

U.S. PATENT DOCUMENTS

| | | | |
|---|---|---|---|
| 8,372,277 B2 | 2/2013 | Kania et al. | |
| 8,877,048 B1* | 11/2014 | Owings | E03F 5/103 |
| | | | 210/170.03 |
| 9,394,677 B2 | 7/2016 | Albers et al. | |
| 2014/0042064 A1* | 2/2014 | Byeon | C02F 3/327 |
| | | | 210/170.01 |
| 2014/0124424 A1* | 5/2014 | Chai | E03F 5/103 |
| | | | 210/170.03 |
| 2018/0320356 A1* | 11/2018 | Wang | C02F 3/327 |

OTHER PUBLICATIONS

Written Opinion received in corresponding PCT Application No. PCT/CA2018/050896, dated Sep. 27, 2018, 8 pages.

* cited by examiner

SYSTEM FOR TREATMENT OF WATER

CROSS-REFERENCE TO RELATED APPLICATIONS

This application claims the benefit under 35 U.S.C 119(e), of U.S. Provisional Application 62/538,541, filed Jul. 28, 2017, the entirety of which is incorporated herein by reference.

FIELD

Embodiments taught herein are directed to systems for treating water and, more particularly, to a contained system utilizing at least ecological communities supported therein for treatment of the water.

BACKGROUND

It is well known in the art of water management, prior to the development of water and wastewater treatment plant technologies, that humans relied on the efficacy of natural surface water treatment systems to deliver water that is safe to use and consume. Steady increases in human population required the development of modern wastewater treatment plants and technologies when natural surface water treatment systems were unable to keep up with the increased waste streams arising from human activities. Nevertheless, surface water treatment systems can still provide treatment for streams of lightly contaminated water including, but not limited to urban and industrial stormwater, agricultural runoff, irrigation return flows and runoff from road rights of way.

Without intent to limit the scope of the subject matter taught herein, but for illustration purposes only of the background related to management of surface water, one particular example of surface water, being stormwater, is discussed in greater detail below.

It is well known in the art of surface water management that before stormwater ponds were part of a typical community stormwater management system, stormwater was conveyed directly from a community to a receiving water body such as a lake or a river. Major stormwater conveyance pipes, used to convey the stormwater thereto, were prone to overload in response to moderately large storm events exceeding the capacity of the conveyance pipes and resulting in local flooding within a community.

Stormwater conveyance pipes are typically designed and constructed to support the planned community build-out time horizon, which is typically anywhere from 20 to 40 years. However, at the end of the planned community build-out horizon, the metropolitan area containing each community generally continues to expand. Around the 1980s, new stormwater management thinking was required for new communities in the metropolitan area beyond the boundaries of existing communities. Developers of newly planned communities have had a desire to tie into the existing stormwater conveyance infrastructure, referred to herein as a stormwater trunk, in older communities, as the cost to convey stormwater around the existing communities is much greater. However, existing communities cannot typically receive additional stormwater from newly planned, outlying communities without severely stressing the existing stormwater trunks during a storm event.

As a result, stormwater ponds were constructed in new communities to temporarily store stormwater drainage from the new community prior to discharging to the existing stormwater trunks. Temporary stormwater storage for later release can be referred to as stormwater flow rate attenuation which forms a critical part of modern, stormwater system design. The attenuation function of stormponds is so effective that it can delay stormwater flows by up to three days and reduce peak flows from a community to the stormwater trunk by an order of magnitude (i.e. 90%) or more. Such attenuation works well for new developments tying into existing stormwater trunks, as stormwater trunks, constructed more than 30 years ago, typically convey water from the older communities for which they were designed to service for a duration of less than a day, after which the stormwater trunk flow is negligible. The attenuated stormwater flow from stormwater ponds in new communities is delivered to the existing stormwater trunk when flow therethrough from the older community has already dropped off considerably or has essentially ceased.

Creeks or other natural conveyance systems and water courses that formerly provided drainage to natural landscapes have developed over time to be in a state of dynamic equilibrium with the runoff volumes and intensities generated by their natural catchment areas. The natural catchment areas are comprised of vegetation and absorbent soils that consume water and act to temporarily store, evapotranspire, infiltrate, or otherwise attenuate the peak runoff flow from the landscape. As urban environments expand in area, extensive areas of former natural and vegetated lands are converted to impervious areas that result in considerable increases in both annual runoff volume and runoff flow intensity from the landscape. The increased runoff results in creeks and other natural conveyance systems becoming exposed to much higher peak flow rates and energy states than have historically been experienced, thus causing erosion and flooding that can expose the public to peril and can put adjacent lands and landowners at risk of property damage.

It is well known by those of skill in the art that high peak flows, particularly in small water courses and the associated bank and bed erosion and water turbidity are detrimental to aquatic life. Thus, the reduction of peak flow achieved by the detention of stormwater run-off is highly beneficial to the ecological health of the downstream water courses and the associated aquatic organisms.

Modern stormwater system design for a community typically assumes gravity flow to and from a stormwater pond. A typical assumption is that a stormwater pond will drain fast enough by gravity that essentially all of the primary water storage volume for the stormpond, assumed during the community stormwater system design, will be available by about two or three days after a storm event has occurred. The primary water storage volume is restored by gravity drainage, gravity being the most reliable means of discharging water therefrom. Discharge rates during draining of a stormpond are considerable and are typically measured in hundreds of litres per second or thousands of US gallons per minute or more. Thus, a pump station to handle such flow rates would be relatively large and expensive, and would only be used infrequently in response to storm events. Furthermore, pumped systems are most likely to experience failures due to power outages during storm events making it undesirable to critically rely on pumped, or otherwise actively controlled systems, for restoring the primary water storage volume of the pond.

Modern stormwater pond design may or may not have perimeter features or portions of the overall pond footprint that are wetland, or otherwise vegetated systems, that rely on the normal presence of water in the stormpond. Vegetated systems have aesthetic appeal, but more importantly are also known to provide valuable water treatment functions. Vegetated systems are generally one component of ecological communities which also comprise animals, fungi, microorganisms and the like. If vegetated systems are part of a pond design, outflow control structures for releasing water from the pond are typically designed to support the long-term health of the vegetated system. It is understood that vegetated systems may be composed of aquatic plants, riparian plants, mesic plants, or combinations thereof. Each of these kinds of vegetated systems requires contextual access to water, with varying limits for the duration and depth of exposure to standing water, moving water or ground water, according to their specific needs. Aquatic plants, specifically referred to herein as wetland plants, that require direct and generally continuous access to surface water are discussed below, however it is understood that vegetated systems in ponds are not limited solely to aquatic plants and may include other kinds of vegetated systems, and any associated topographic or bathymetric features, where appropriate.

Different aquatic plants thrive in different depths of water, but typically for vegetated systems, a relatively shallow water depth, such as less than about 0.5 m deep, is commonly found in wetlands associated with emergent aquatic plants. Furthermore, emergent aquatic plants thrive when the depth of water remains within a relatively narrow range for most of the growing season. Flooding within ponds that raises the water level beyond the ideal depth for such wetland plants, typically does not last more than a day for most inflow events and may occur, for example, about a dozen times during a season. Further, flooding for up to three days is unlikely to occur more than one or two times during a season. The relatively infrequent amount and duration of flooding in a pond during a season occurs without negative effect on the plants within the wetland. In fact, occasional flooding to deeper than the ideal depth or occasional drying out of the surface soil can temporarily take place for durations of a week or two or longer, typically without damaging the wetland plant community.

A prior art stormwater pond system that operates entirely by gravity flow has other limitations with respect to water treatment effectiveness. Specifically, such systems utilize a "single pass" treatment, which limits the available treatment contact time that contaminated water may have with a system that uses ecological communities to provide surface water treatment functions. Further, operating only by gravity typically means that in stormpond settings the water level in a permanent water body cannot fall below a design gravity spill elevation.

There continues to be interest in effective and efficient systems for managing runoff water from inflow events, such as storms, and water collected in ponds, for minimizing erosion, flooding and damage to property, such as during times of high water availability, as may be the case during a rainy season.

Further, there is interest in systems for metering out stored water over long periods of time to sustain base flows to sensitive environments during times of low water availability, as may be the case during a drought.

There is also interest in systems that provide a high and consistent quality water outflow from a pond, with low yet consistent life cycle operating and maintenance cost, while maintaining and supporting healthy, diverse and desirable ecological communities in or near a pond.

SUMMARY

Embodiments disclosed herein comprise a pond or containment having primary semi-isolated treatment areas constructed or designated therein, which are suitable for establishing ecological communities for treatment of water within the containment. Water for treatment is induced to flow through the semi-isolated areas and the ecological communities therein for treating the water. The treated water is then discharged from the semi-isolated areas, such as for use downstream. Discharge of the treated water from the primary semi-isolated treatment areas, as well as the use of pump systems, induces the flow of water through the semi-isolated areas. In embodiments, pumping systems are also used to circulate the water through the semi-isolated areas which may also establish a recirculation of the water through the containment. Ecological communities may be established in relatively shallow secondary treatment areas in the containment and the recirculation of water therethrough may further act to treat the water in the containment.

In embodiments, beneficial treatment and use opportunities are enabled by actively managing the stored water volume below a design gravity spill elevation and by actively circulating water through the ecological communities to provide enhanced surface water treatment functions. The water may be actively circulated multiple times through the ecological communities.

In embodiments, it is contemplated that the system is capable of treating waste streams such as grey water, comprising low pathogen contaminated water from showers, laundry facilities and the like or partially treated effluent from black water systems discharging water containing high pathogen levels, including but not limited to contaminated water from toilet flushing.

In one broad aspect, a system for treatment of water therein comprises a main water body for collecting the water therein. The main water body has one or more inlets thereto for receiving an inflow of the water; and at least one gravity outlet for controlled drainage and discharge of the water therefrom for establishing a first gravity normal water level in the main water body. One or more primary semi-isolated treatment areas are located within the main water body, each of the one or more primary semi-isolated treatment areas having an average bottom elevation higher than an average bottom elevation of the main water body, the one or more primary semi-isolated treatment areas having a second gravity normal water level. One or more ecological communities are supported within the one or more primary semi-isolated treatment areas for treating the water flowing therethrough for beneficially affecting the quality of treated water therein. At least one pump system continuously or intermittently pumps water between the main water body and the one or more primary semi-isolated treatment areas, for maintaining the water level therein at the second gravity normal water level. One or more treatment area outlets fluidly connected to each of the one or more primary semi-isolated treatment areas discharges the treated water therefrom, wherein the pumping of water between the main water body and the discharging of water from the one or more primary semi-isolated treatment areas induces the flowing of the water through the one or more ecological communities.

In another broad aspect, a method for treatment of water within a main water body comprises semi-isolating one or more primary treatment areas of the main water body, the one or more primary semi-isolated treatment areas having an average bottom elevation higher than an average bottom elevation of the main water body. Ecological communities are established within the one or more primary semi-isolated treatment areas. Water is continuously or intermittently pumped between the main water body and the one or more primary semi-isolated treatment areas. A portion of the treated water is discharged from the one or more primary semi-isolated treatment areas for delivery downstream from the system, wherein the pumping and discharging steps induce a flow of at least a portion of the water in the main water body through the ecological communities in the primary semi-isolated treatment areas for treating the water flowing therethrough.

Embodiments are described herein in the context of surface water, specifically stormwater and the containment is a stormpond constructed according to embodiments taught herein for treatment and for enhanced attenuation of the stormwater therein. One of skill in the art will appreciate however that embodiments are not limited to stormwater and are applicable to all types of water and further, that the containment is not limited to a stormpond, but instead can be any form of containment in which the water of interest can be contained and induced to flow within the containment in the manner described herein for treatment and discharge therefrom.

DETAILED DESCRIPTION

Systems taught herein are suitable for treatment and attenuation of surface water, including, but not limited to stormwater, industrial water, grey water and at least partially treated black water streams. Without intent to limit the application of such systems, for ease of discussion, the embodiments are described below in the context of stormwater and pond systems for treatment and attenuation thereof.

Prior Art

Figure 1A:
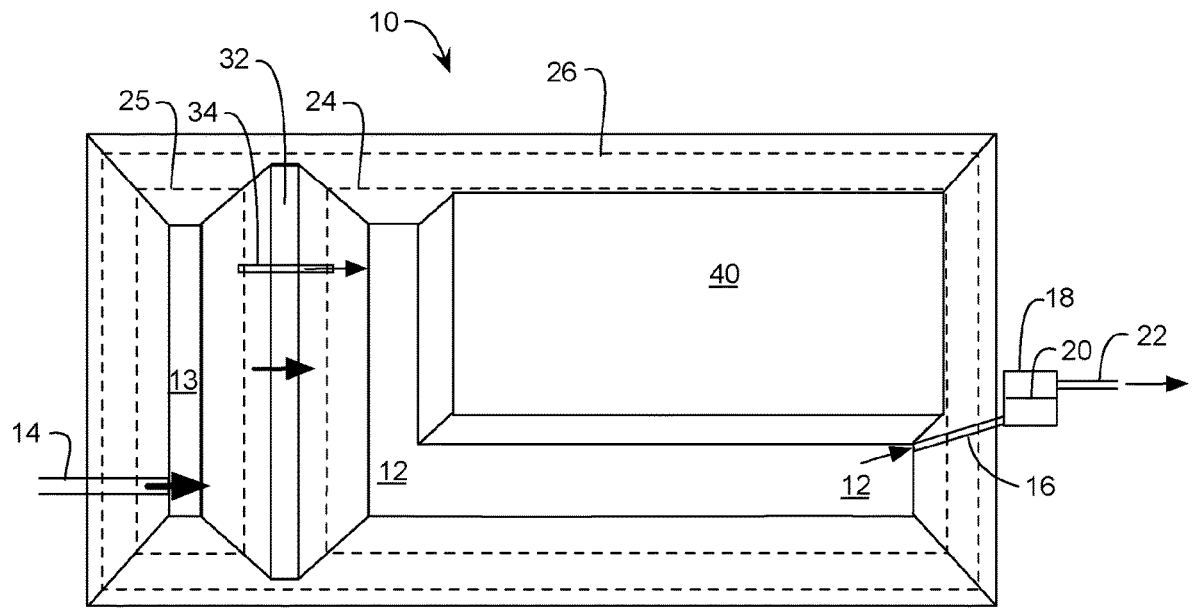
FIG. 1A is a schematic illustration of a prior art containment wherein a portion of the containment area is devoted to the maintenance of an ecological community.
Figure 1B:
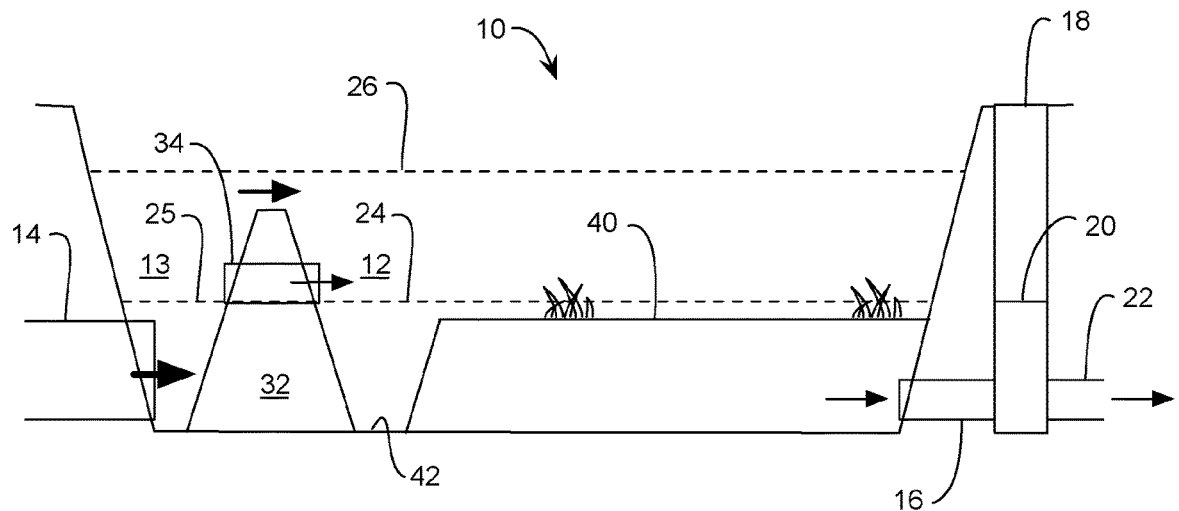
FIG. 1B is a vertically exaggerated, cross-sectional view, according to FIG. 1A.

FIGS. 1A and 1B schematically illustrate a prior art pond 10 having a main water body 12 with one or more inflow pipes 14 discharging into one or more pre-treatment water bodies 13. The main water body 12 is drained by at least one outflow pipe 16 that discharges to at least one control structure 18 having at least one interior water level control element 20. Water passing over the at least one water level control element 20 leaves the system through at least one drain pipe 22. A first gravity normal water level 24 is maintained in the main water body 12 by the at least one water level control element 20. The one or more pre-treatment areas 13 have a pre-treatment gravity normal water level 25 that may be different from the first gravity normal water level 24 in the main water body 12 due to the presence of one or more containment berms 32 and one or more flow conveyance elements 34 for fluidly connecting the one or more pre-treatment areas 13 to the main water body 12. When the pond 10 receives sufficient inflow water, the water level rises to a high-water level 26 which may result in the normally separate main water body 12 and the one or more pre-treatment areas 13 combining to form a single contiguous water body.

Moderate flow rates received from the one or more inflow pipes 14 may be conveyed from the one or more pre-treatment water bodies 13 to the main water body 12 via the one or more flow conveyance elements 34, whereas high flow rates that overwhelm the ability for the one or more flow conveyance elements 34 to convey water may cause inflow water to pass over the one or more containment berms 32. One or more shallow areas 40 are formed in the main water body 12, the water thereover being at the first gravity normal water level 24. The one or more shallow areas 40 however have a bottom elevation higher than a bottom 42 of the pond 10 when compared to the remainder of the main water body 12 resulting in a relatively shallow depth of water over the one or more shallow areas 40, such as less than about 0.5 m deep during periods when the level of the water in the main body 12 of the pond 10 is at the first gravity normal water level 24. The one or more shallow areas 40 may be designed to provide an ideal location for growing wetland plants or other vegetated environments in ecological communities thereat for many reasons including, but not limited to, limited water quality improvement and aesthetics.

In the prior art pond 10 however, water stored in the main water body 12 may or may not flow through the one or more shallow areas 40, as the water moves from the one or more inflow pipes 14 to the at least one outflow pipe 16. Thus, water exchange between the one or more shallow area 40 and ecological communities supported thereon and the main water body 12 is typically ineffective with respect to consistently altering the overall water quality in the main water body 12. Further, water quality may also be considerably different between portions of the one or more shallow areas 40 and the main water body 12.

Embodiments to Enhance Water Quality

Where components of the embodiments taught herein are the same as those in the prior art pond system 10 described above, the same reference characters have been used.

Embodiments of a pond system 100 taught herein provide treatment of water stored in the pond 100 as well as enhanced flow attenuation, over and above prior art pond designs. Further, with respect to treatment, embodiments comprise features which beneficially affect the quality of water discharged from the pond 100, such as for use for other purposes downstream thereof.

In embodiments disclosed herein, a pond area or footprint is contemplated to include at least elevations which encompass the high-water level 26, for which the pond is designed. The footprint further includes at least a freeboard area designed to surround the pond within the community. For example, a freeboard of from about 0.5 to 1 m is typically allowed above the elevation of the high water level 26. Embodiments of the systems and methods described herein operate at least within the pond 100 footprint, as defined above.

In embodiments, one or more primary semi-isolated treatment areas 102 are located within the main water body 12. "Semi-isolated" used herein is intended to mean areas of a pond system 100 that are in the main water body 12, but which would not normally be within an active flow of water from the one or more inflow pipes 14 to the at least one gravity outflow pipe 16, between inflow events, unless the flow of water is induced to flow therethrough, as taught herein. The one or more primary semi-isolated treatment areas 102 have a typical depth of water therein that is shallower than in the main water body 12 and may be constructed as fully or partially contained areas. Alternatively, the one or more primary semi-isolated treatment areas 102 may be functionally semi-isolated from the main water body 12 without a physical containment, but instead by virtue of the typically shallow water depth therein and a resulting ineffective exchange of water between the one or more primary semi-isolated treatment areas 102 and the main water body. Furthermore, the one or more primary semi-isolated treatment areas 102 can simply be areas positioned remote from the one or more inflow pipes 14 and the at least one outflow pipe 16, such as adjacent a pond margin area 103 of the pond system 100. The pond margin area 103 is the portion of a pond system 100 that is sometimes submerged and sometimes unsubmerged by water and generally limited to portions of the pond 100 below an elevation about half way between the high water level 26 and the first gravity normal water level 24.

Figure 2A:
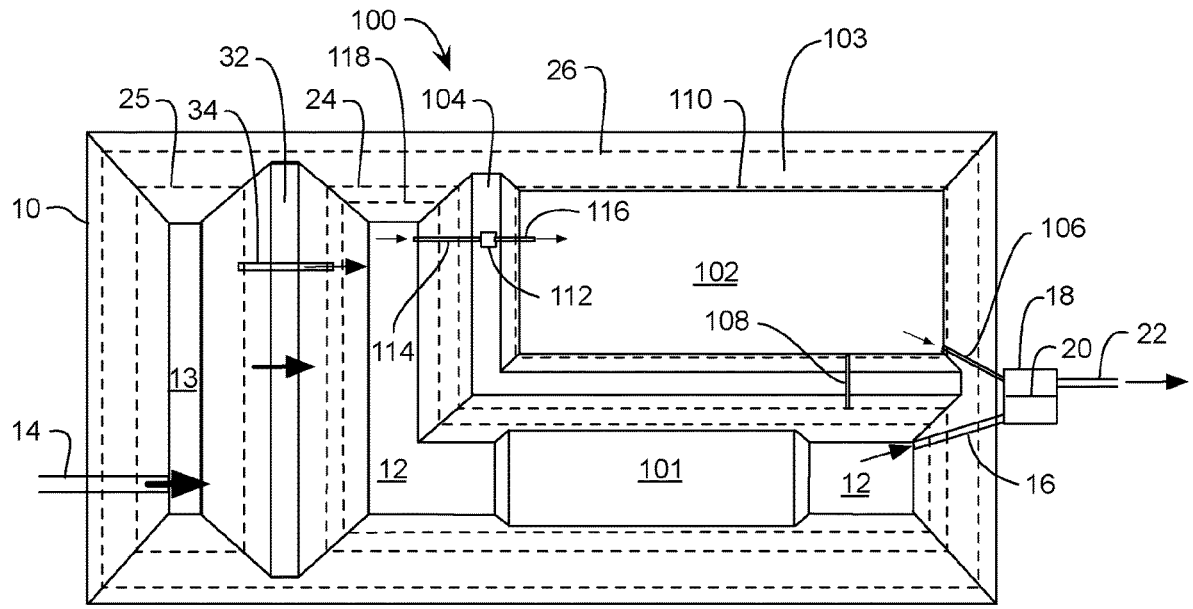
FIG. 2A is a plan view, schematic illustration of a containment system according to an embodiment disclosed herein having multiple areas devoted to one or more ecological communities through which water is induced to flow and with active pumping to maintain the one or more ecological communities at suitable water depths.
Figure 2B:
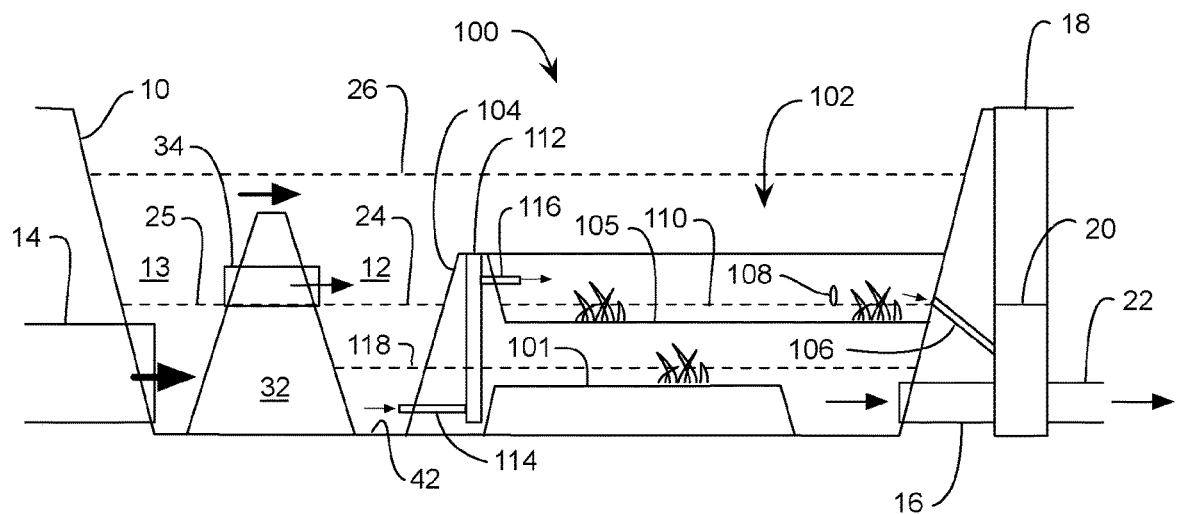
FIG. 2B is a vertically exaggerated, cross-sectional view, according to FIG. 2A.

In an embodiment of the pond system 100, such as shown schematically in FIGS. 2A and 2B, each of the one or more primary semi-isolated treatment areas 102 is semi-isolated from the main water body 12 by at least one or more partial containments 104. In embodiments, the one or more partial containments 104 are at least a partial berm that can either completely contain the water in the one or more primary semi-isolated treatment areas 102, or can partially contain the water therein. Each of the one or more primary semi-isolated treatment areas 102 is fluidly connected to one or more treatment area outlets 106 for discharge of water therefrom. One or more water conveyance elements 108 fluidly connect each of the one or more primary semi-isolated treatment areas 102 with the main water body 12 and may serve to augment the drainage flow rate from each of the one or more primary semi-isolated treatment areas 102 through the one or more treatment area outlets 106, or to provide a water level equalization function between each of the one or more primary semi-isolated treatment areas 102 and the main water body 12, when a water level in the main water body 12 rises in response to an inflow event. When the water level in the main water body 12 rises to flow over the one or more partial containments 104, the one or more primary semi-isolated treatment areas 102 generally ceases to be semi-isolated having formed a contiguous water surface between the one or more primary semi-isolated treatment areas 102 and the main water body 12.

Each of the one or more primary semi-isolated treatment areas 102 generally has a second gravity normal water level 110 that is maintained either by the one or more treatment area outlets 106, the one or more water conveyance elements 108, the water level in the main water body 12, at least one pump system 112, as discussed below, or combinations thereof. Thus, for each of the one or more primary semi-isolated treatment areas 102, water is induced to flow therethrough and therefrom via at least the one or more treatment area outlets 106.

In embodiments, a topography of a bed or bottom 105 of the one or more primary semi-isolated treatment areas 102 varies, however an average bottom 105 elevation is higher than an average bottom 42 elevation of the main water body 12. An average water depth in each of the one or more primary semi-isolated treatment areas 102 is therefore shallower than an average water depth in the main water body 12 and variable therein with the varying bottom topography.

One or more ecological communities are supported in the one or more primary semi-isolated treatment areas 102, as described in greater detail below, the flow of water induced therethrough being exposed to the one or more ecological communities for treatment thereof.

In embodiments, the system 100 further comprises one or more secondary treatment areas 101. Much like the shallow areas 40 in the prior art pond 10, the bottom or ground area 42 of the main water body 12 is elevated in localized areas to form the one or more secondary treatment areas 101 for the purpose of supporting ecological communities in the main water body 12 that require a shallower water depth than is otherwise present in the main water body 12.

The at least one pump system 112 is provided to withdraw water from the main water body 12 through one or more inflow pipes 114 for discharge to the one or more primary semi-isolated treatment areas 102 within the one or more partial containments 104, via one or more pump outlets 116. Operating the at least one pump system 112 in a manner that maintains the water level in the one or more primary semi-isolated treatment areas 102, such as to continuously or intermittently cause water to discharge from each of the one or more primary semi-isolated treatment areas 102 to the one or more treatment area outlets 106, eventually causes the water level in the main water body 12 to fall from the first gravity normal water level 24 to a pumped normal water level 118 resulting in a shallow water depth, such as the less than about 0.5 m, over the one or more secondary treatment areas 101, suitable for supporting target ecological communities. Once the water level in the main water body 12 reaches the pumped normal water level 118, the at least one pump system 112 is generally shut off, or switched to an alternate operating state that does not cause water to leave the pond system 100. The resulting pond system 100 has up to two types of shallow treatment areas, primary semi-isolated 102 and secondary 101, each of which may be situated at different elevations within the main water body 12 and awaiting an inflow event to deliver water to the one or more inflow pipes 14.

In embodiments, both the normal water depth over the one or more primary semi-isolated treatment areas 102 and the depth of the pumped normal water level 118 over the one or more secondary treatment areas 101 can be designed to be an ideal water depth for supporting diverse ecological communities.

Figure 2C:
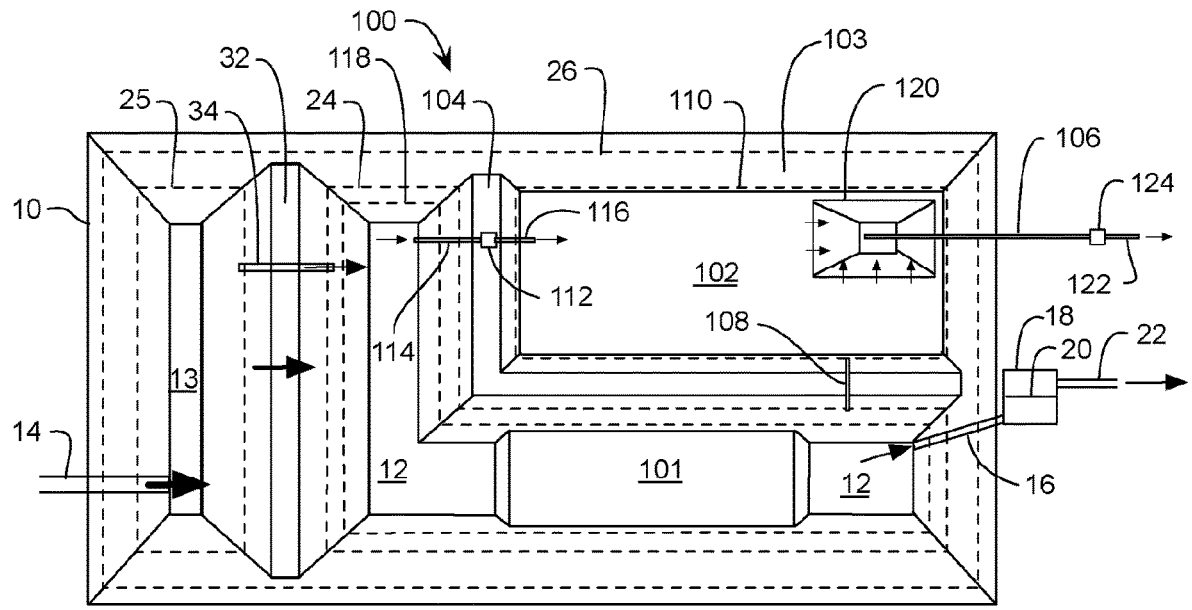
FIG. 2C is a plan view, schematic illustration of a containment system according to FIG. 2A and having a filtration media layer beneath the one or more ecological communities to provide additional water quality improvement benefits thereto.
Figure 2D:
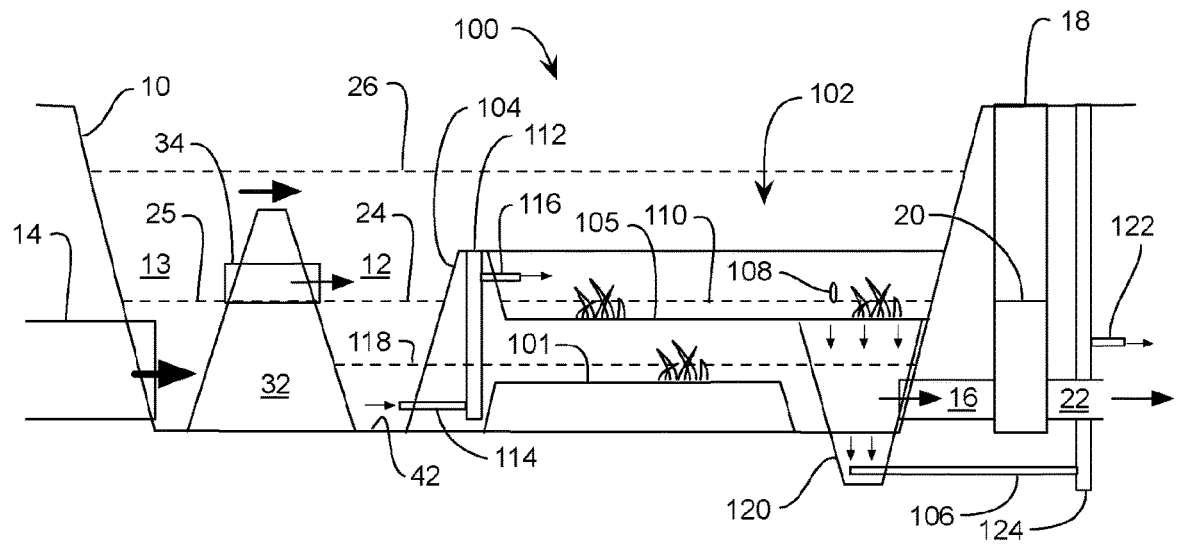
FIG. 2D is a vertically exaggerated, cross-sectional view, according to FIG. 2C.

In embodiments, FIGS. 2C and 2D schematically illustrate a further embodiment, wherein the one or more treatment area outlets 106 discharges water from the one or more primary semi-isolated treatment areas 102, after passing through one or more filtration layers 120. The filtration layers can be comprised of granular media, including but not limited to sand and activated charcoal, permeable membranes, chemically active systems or any other substance or system, actively or passively operating, that enables the separation of dissolved or undissolved matter from water.

It is well known in the art of water treatment that filters can be used to improve water quality. Without intent to limit the scope of the subject matter taught herein, one particular example of a conventional filter, being a sand filter, is discussed. In sand filter design, a surface loading rate, typically defined as the depth of standing water over the surface of a sand filter that passes each hour through the surface plane of the sand filter, influences how frequently the sand filter must be maintained. A higher surface loading rate requires less sand filter surface area to treat a given volume of water in a given period of time than a lower loading rate. Generally, however, a higher surface loading rate also requires more expensive support infrastructure in the form of pumps, valves, monitoring and control equipment, more input in the form of power, chemicals and maintenance staff person hours, and a higher initial capital investment than would otherwise be required for a lower surface loading rate to treat a given volume of water in a given period of time.

A surface loading rate of up to 10 metres per hour or more is possible for a type of sand filter, known by many terms of art, but referred to herein as a rapid sand filter. The high loading rate of a rapid sand filter generally requires maintenance, typically in the form of backwashing, such as at least daily if not many times per day. A key benefit of the rapid sand filter is that it can be designed to work as a treatment system even when faced with very turbid source waters. High turbidity in the source water typically increases the frequency of backwashing required to maintain desired filter functionality.

A surface loading rate of between 0.1 and 0.25 metres per hour is possible for a type of sand filter, known by many terms of art, but referred to herein as a slow sand filter. A slow sand filter functions by developing a biofilm layer on the surface of the sand filter, the biofilm being typically referred to by the German word Schmutzdecke. It is the biological activity within the biofilm layer, rather than the underlying sand media, that provides the principle water filtration benefit. A slow sand filter may not require maintenance on the surface layer for months or longer and a maintenance operation is typically achieved by scraping the surface layer rather than backwashing using complex and energy intensive pumping systems. The cost of operating a slow sand filter is typically much lower per unit surface area compared to a rapid sand filter but much larger surface areas are required for a slow sand filter to treat a given volume of water in a given period of time than would be required for a rapid sand filter. A further limitation on the use of a slow sand filter for treating water is that the source water passing through the surface of the filter typically must have very low turbidity so as to not prematurely cause the filter surface to plug with particulate matter.

Filtration of water through a soil structure to a buried drain system or an underlying permeable substrate, is also well known in the art of stormwater management. The steady surface loading rate of such a filter is typically limited to steady soil infiltration rates in the range of 100 mm per hour or less. Long term self-maintenance of a desired surface loading rate is typically achieved by populating the filter surface with plants which, through the action of stem and root growth and death, and through the actions of other organisms that form part of an ecological community associated with the plants, serves to actively break up a surface layer of deposited materials that might otherwise cause plugging of a filter surface. Human maintenance activities of these kinds of filters may be measured in at least years or even decades or more, unless high sediment loads are frequently received in the inflowing water. The surface of constructed stormwater filters of this kind are typically only occasionally and temporarily submerged by water with the normal state of the filter surface being unsubmerged.

In embodiments incorporating the one or more filtration layers 120, the one or more treatment area outlets 106 ultimately discharge to an end use location that requires even higher and more consistent water quality than could be delivered by the embodiment shown in FIGS. 2A and 2B.

In embodiments, the one or more treatment area outlets 106 may discharge downstream from the one or more water level control elements 20 in the one or more control structures 18 for ultimate discharge through one or more drain pipes 22. Water passing through the one or more treatment area outlets 106 may flow by gravity. Alternatively water passing through the one or more treatment area outlets 106 may pass through one or more transition structures 124, or through the one or more control structures 18, which can provide additional control over discharge conditions through appurtenances, including but not limited to, pumps, valves, weirs or other such control means.

Although the one or more treatment area outlets 106 are illustrated in FIGS. 2C to 2F as a pipe, one of skill in the art would understand that the one or more filtration layers 120 can be drained in many ways, including but not limited to, a sand or a gravel drain, high permeability geotextiles or other such means. In embodiments, the one or more filtration layers 120 may function as illustrated with vertical, downward flow. Alternatively or additionally, the one or more filtration layers 120 can be built into beneath or adjacent one or more of the pond margin areas 103, thus inducing lateral flow therethrough.

Figure 2E:
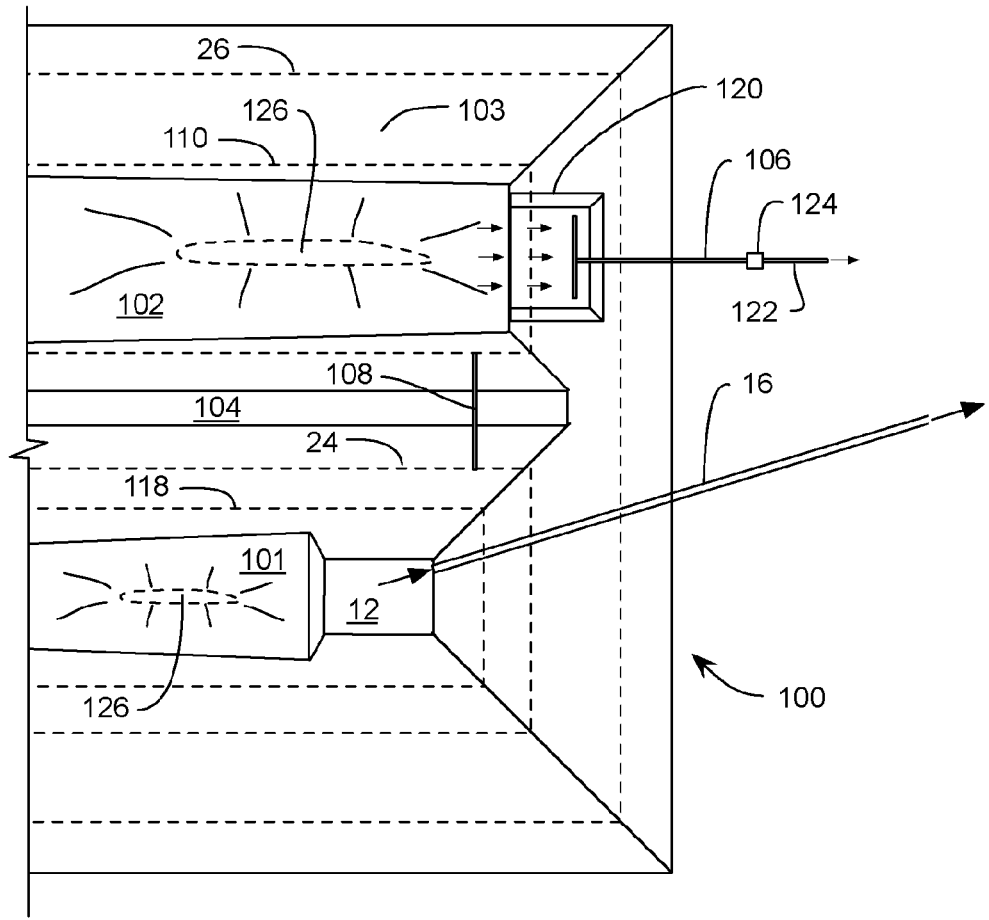
FIG. 2E is a partial plan view schematic illustration of the system according to FIG. 2A with islands and non-uniform bed topographical and bathymetrical features supporting diverse ecological communities and having a filtration media layer at a base of at least one side of the pond and adjacent one or more ecological communities for providing additional water quality improvement benefits thereto.
Figure 2F:
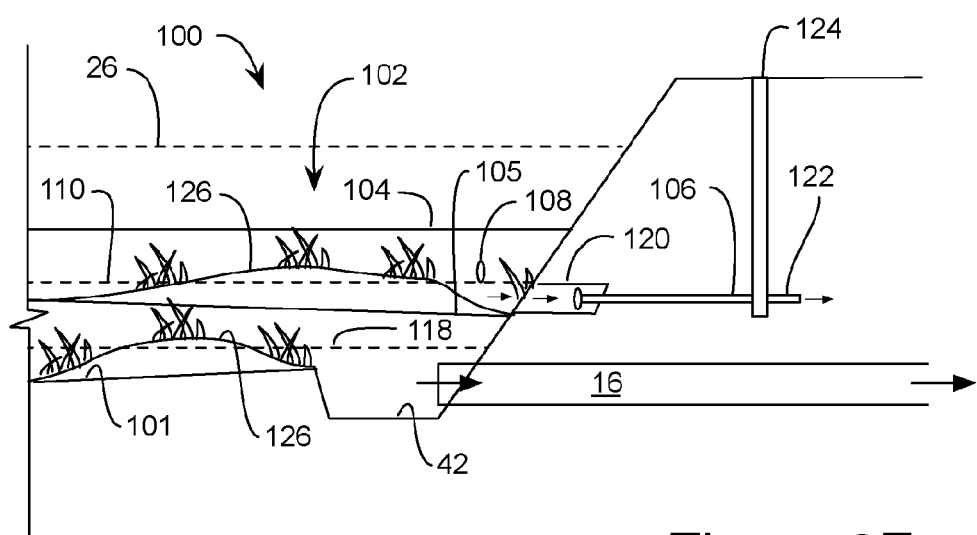
FIG. 2F is a vertically exaggerated, cross sectional view, according to FIG. 2E.

As shown in FIGS. 2E and 2F, in a further embodiment, portions 126 of the bottom 105 of the one or more primary semi-isolated treatment areas 102, the one or more secondary treatment areas 101 or both, extend above a surface of the water. The varying depths of the water, which includes the areas 126 that are not submerged in the water at all, or are not submerged in water at all times, act to support the diversity of the one or more ecological communities therein.

Further shown in FIGS. 2E and 2F, in embodiments the one or more filtration layers 120, through which the water from the one or more treatment area outlets 106 discharges, are built into the pond margin 103, for lateral flow therethrough, rather than the vertical flow as shown in FIGS. 2C and 2D. In both cases, vegetation is established thereat, which would otherwise be directly exposed to the flow of water. As described below, the vegetation acts to protect the media surface from erosion, and to minimize plugging or blinding off of the filtration layers 120.

In embodiments, the surface of the media, comprising the one or more filtration layers 120 within the one or more semi-isolated treatment areas 102, is populated by vegetation which enables the establishment of one or more ecological communities on or near the surface of each of the one or more filtration layers 120. Provided the one or more filtration layers 120 are not smothered by inappropriately rapid accumulations of sediment or detritus, such as more than about 100 mm per of sediment accumulation per year on the surface, the combined activities of the plants and other organisms naturally maintain the surface porosity of the growing media, which in this case is the same as the filtration media, as each organism lives out its life cycle.

In embodiments, the rate of accumulation of sediment or detritus on the surface of the one or more filtration layers 120 can be limited by limiting the surface loading rate, the typical turbidity of the water passing through the surface of the one or more filtration layers 120, or a combination thereof. In embodiments, the surface loading rate of the one or more filtration layers 120 does not exceed well known constant soil infiltration rates, which may be in the range of about 100 mm per hour or less for a sandy vegetation growing media. Furthermore, the one or more filtration layers 120 are located far enough away from the at least one pump system 112 so as to benefit from water quality improvements effected by intermediate ecological communities established within the one or more semi-isolated treatment areas 102, such that the turbidity of the water that is drawn through the surface of the one or more filtration layers 120 is below a target threshold for the one or more filtration layers 120 to function as intended, without plugging.

In embodiments, the pond 100 is designed so that an occasional increase in turbidity above a target threshold at the surface of the one or more filtration layers 120 does not threaten the health and vitality of the one or more ecological communities established therein by limiting the duration of an increased turbidity event, limiting the magnitude of increase in turbidity above a target threshold, temporarily reducing or stopping the movement of water through the surface of the one or more filtration layers 120, or a combination thereof. Such an occasional turbidity increase event may happen in response to a large inflow event when the water level in pond 100 is above the top of the one or more partial containments 104, in which case the one or more primary semi-isolated treatment areas 102 are temporarily not isolated from the main pond body 12. The one or more partial containments 104 are generally designed such that an increase in turbidity event does not happen very often, such as no more than about once or twice per year.

In embodiments, the one or more filtration layers 120 may have an upper elevation below or above that of the second gravity normal water level 110.

As with the embodiments shown in FIGS. 2C and 2D, the one or more treatment area outlets 106 ultimately discharge to an end use location that requires even higher and more consistent water quality than could be delivered by the embodiment shown in FIGS. 2A and 2B.

Applicant believes that water, including, but not limited to stormwater, grey water or black water, having undergone a minimum of pre-treatment, when treated according to embodiments taught herein, with or without the use of filtration layers 120, is discharged at a quality suitable for recreational use, without the need for further disinfection. Water discharged at a recreational standard can be safely used for recreational purposes, irrigation and can be sprayed in the air. In this context, "safe" is generally used to indicate pathogen populations in the treated water have been reduced to a level of an acceptably low risk of infection resulting from human contact. Additional benefits may be derived from embodiments taught herein in addition to the ability to treat various sources of water, such as reducing sewage lagoon size and reducing the requirements for conventional water treatment.

Figure 3:
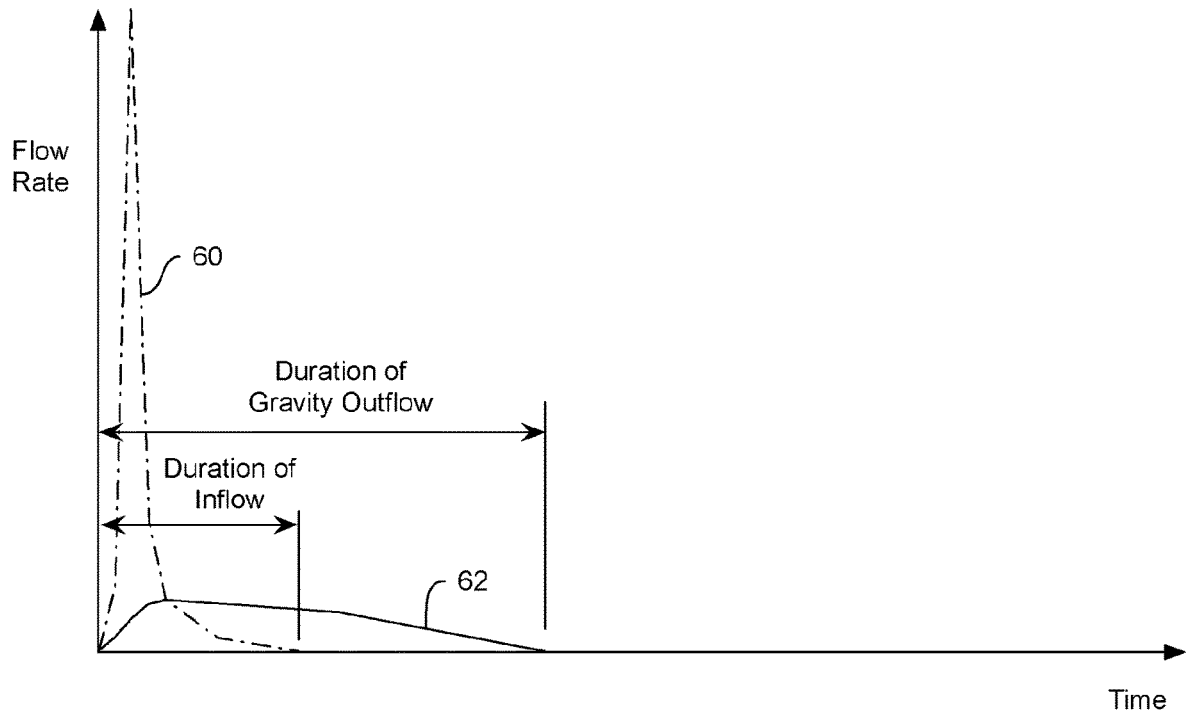
FIG. 3 is a graphical representation of a relationship between inflow and outflow in a prior art pond, configured according to FIG. 1A.

FIG. 3 graphically represents the relationship between flow rate over time for the prior art pond 10, as an inflow hydrograph 60 illustrating water delivered to the one or more pre-treatment water bodies 13 via the one or more inflow pipes 14. A gravity outflow hydrograph 62 illustrates water leaving the pond 10, exclusively via the at least one outflow pipe 16. If the initial water level in the one or more pre-treatment water bodies 13 is at the pre-treatment gravity normal water level 25, neglecting other losses, including, but not limited to, evapotranspirative losses, and the initial water level in the main water body 12 is the first gravity normal water level 24, a total volume of water delivered according to the inflow hydrograph 60 is the same as the total volume of water delivered according to the outflow hydrograph 62, once the water level in the main water body 12 returns to the first gravity normal water level 24.

Under this scenario, outflow of water through the at least one outflow pipe 16, according to the outflow hydrograph 62, will commence immediately as water begins to enter the one or more inflow pipes 14, according to the inflow hydrograph 60. The rate of rise of flow in the outflow hydrograph 62 is much smaller than the rate of rise of flow in the inflow hydrograph 60, which results in considerable flow rate attenuation, and a considerable reduction in peak outflow relative to the peak inflow, that is typical of conventional ponds.

Figure 4:
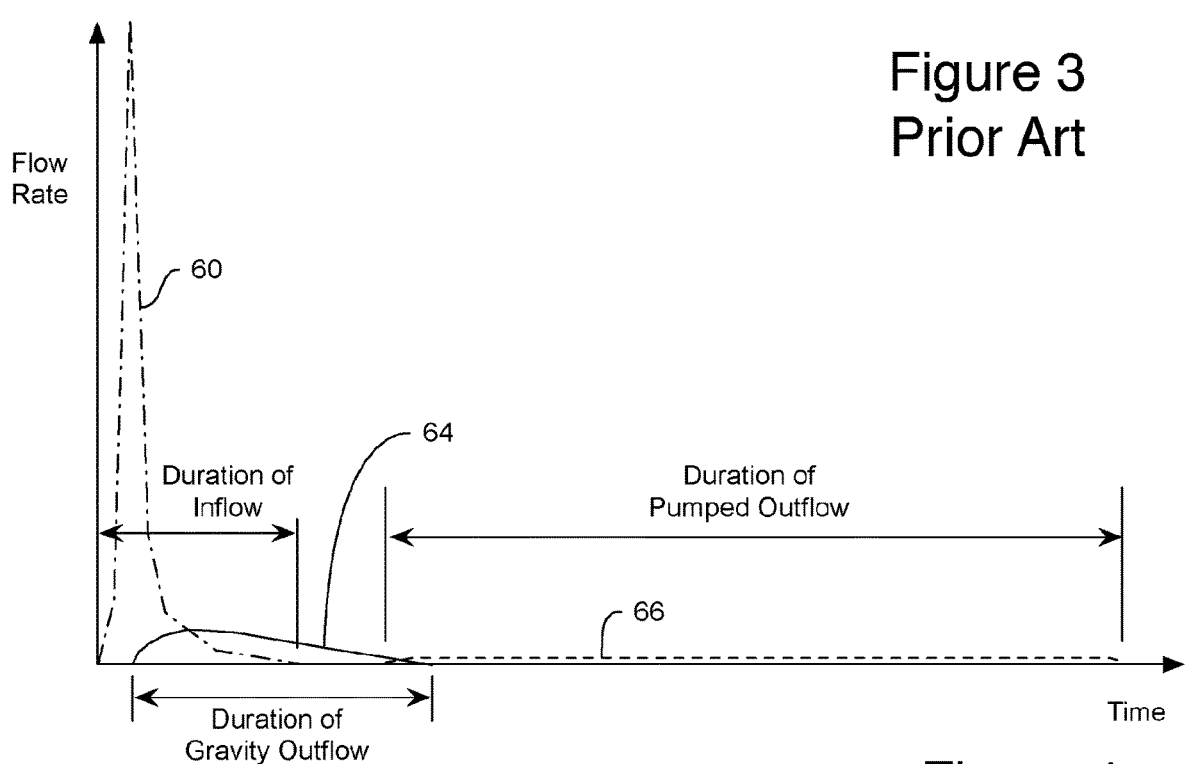
FIG. 4 is a graphical representation of a relationship between inflow and outflow in a pond according to FIGS. 2A through 2E and highlighting a difference between gravity flow and pumped flow.

In contrast, FIG. 4 schematically illustrates the relationship between flow rate over time for the embodiments of the pond 100 shown in FIGS. 2A-2F. As in the prior art case, the inflow hydrograph 60 illustrates water delivered to the one or more pre-treatment water bodies 13 via the one or more inflow pipes 14 however, the gravity outflow hydrograph 64 illustrates water leaving the pond 100 via both the at least one outflow pipe 16 and the one or more treatment area outlets 106. If the initial water level in the one or more pre-treatment water bodies 13 is assumed to be at the pre-treatment gravity normal water level 25, neglecting other losses including, but not limited to, evapotranspirative losses, the initial water level in the main water body 12 is at the pumped normal water level 118 and the initial water level in the one or more primary semi-isolated treatment areas 102 is at the second gravity normal water level 110, the total volume of water delivered by the inflow hydrograph 60 is the same as the total volume of water delivered by both the gravity outflow hydrograph 64 and the pumped outflow hydrograph 66 once the water level in the main water body 12 returns to the pumped normal water level 118.

Unlike the outflow hydrograph 62 in FIG. 3, the gravity outflow hydrograph 64 shown in FIG. 4 does not show outflow commencing immediately as water begins to enter the one or more pre-treatment water bodies 13 via the one or more inflow pipes 14 according to the inflow hydrograph 60. The delay in commencement of outflow is because the water level in the main water body 12 must rise to the first gravity normal water level 24 before water can begin spilling from the one or more control structures 18 past the one or more water level control elements 20 and away from the pond 100 via the at least one drain pipes 22. The delay in initiating discharge from the at least one drain pipes 22 is beneficial as it reduces the load on downstream storm trunk pipes at a time when those pipes may be stressed dealing with inflows from communities that may not have ponds to provide flow rate attenuation.

In addition to the delayed onset of gravity discharge from pond 100, the peak flow rate is reduced and the duration of gravity flow is shortened for the outflow hydrograph 64 of pond 100 relative to the outflow hydrograph 62 of pond 10.

A reduced peak and duration of gravity flow for an outflow hydrograph is beneficial for reducing stress on storm trunk pipes and on sensitive creeks and streams that ultimately receive water discharged from pond 100.

In embodiments, berms are illustrated herein as containment barriers however, walls, fabric barriers or other means of containing water may be applied to provide barriers to flow. Similarly, pipes are indicated herein to represent water conveyance elements, whereas one of skill in the art would understand that other means of conveyance may be implemented as appropriate, including but not limited to, channels, weirs, orifices, granular media, or high permeability geotextiles. Similarly, the one or more water level control elements 20 in the one or more control structures 18, as illustrated in FIGS. 1A to 2D, resembles a weir wall, however any other appropriate means of passively or actively controlling water level may be applied based on a spill elevation, including, but not limited to, an orifice, a weir, a valve, a gate, a pipe, a berm or a channel. By way of example, the at least one drain pipe 22 or the at least one outflow pipe 16, could have an invert elevation equal to the target first gravity normal water level 24, potentially removing any requirement for a discrete water level control element 20.

Embodiments of the pond 100 taught herein have numerous benefits. A key benefit includes increasing the amount of active storage in the pond 100 by drawing the water level in the main water body 12 below the first gravity normal water level 24.

Active storage in the prior art pond 10 can be referred to as a primary water storage volume and represents the volume of water contained between the first gravity normal water level 24 and the pre-treatment water body gravity normal water level 25, relative to the high water level 26.

Active storage in embodiments of the pond 100 taught herein represents the volume of water contained between the pumped normal water level 118, the pre-treatment water body gravity normal water level 25 and the second gravity normal water level 110, relative to the high water level 26. Thus, active storage in the pond 100 is typically greater than the active storage in the prior art pond 10. The increase in active storage, referred to herein as a secondary water storage volume, illustrated as the storage volume contained in the main water body 12 between the first gravity normal water level 24 and the pumped normal water level 118, is gained without an increase in the overall footprint of the pond 100 compared to the prior art pond 10 and results in an increase in flow rate attenuation functionality for the pond 100.

In embodiments, the pond 100 results in induced flow, resulting from the one or more treatment area outlets 106 and pumped flows from the at least one pump system 112, passing through the one or more primary semi-isolated treatment areas 102, which may be populated by ecological communities, including a variety of plants, animals, fungi and other organisms. The pond 100 thus provides an opportunity to treat or beneficially affect the water, such as by bio-filtering, prior to discharge from the one or more primary semi-isolated treatment areas 102 via the one or more treatment area outlets 106. Bio-filtering of the water generally benefits receiving environments, downstream from the pond 100, which receive water from the at least one drain pipe 22 or from the one or more drain pipes 122, as cleaner water will tend to be discharged from pond 100 than would be the case for a prior art pond 10. Other benefits include, but are not limited to, reducing the population of pathogenic organisms in the water passing through the one or more treatment areas for discharge to the one or more treatment area outlets 106.

In embodiments that include passing water through the one or more water conveyance elements 108 to the main pond body 12, recirculation of water through the at least one pump system 112 results in a general improvement in the water quality in the main pond body 12 which reduces pathogenic organism populations, thus improving the safety of the water in the main pond body 12.

Embodiments of the pond 100 result in more variation in ecological communities that also tend to be healthier and more resilient than the prior art pond 10. Such ecological communities, including, but not limited to wetlands, wet meadows, fens, and riparian environments, may be located and supported at average elevations that are considerably above, below or coincidental with the first gravity normal water level 24 of both the prior art pond 10 and embodiments of the pond system 100 described herein.

In embodiments, a total area of the pond 100 covered by the one or more primary semi-isolated treatment areas and the one or more secondary treatment areas 102, 101 can be designed to be larger than the one or more shallow areas 40 in the prior art pond 10, potentially resulting in greater and more desirable biological functionality and diversity for the entire pond 100.

In embodiments, the one or more treatment area outlets 106 discharge to one or more outlet control structures 124, 18, wherein a pump (not shown) may be used to draw water from the treatment area 102 for delivery to a beneficial end use downstream from the one or more outlet control structures 124, 18.

In embodiments, the one or more treatment area outlets 106 and the at least one pump system 112 are used to induce recirculation flow in the pond 100 through the one or more water conveyance elements 108, the one or more primary semi-isolated treatment areas 102 and the one or more secondary treatment areas 101, to remove nutrients from the water and mitigate against problems such as weeds and algae growth in the main water body 12.

In contrast, the prior art pond 10 shown in FIG. 1A, the one or more shallow areas 40, can be out of nutrient balance relative to the main water body 12 if there is insufficient or ineffective exchange of water between the main water body 12 and the one or more shallow area 40. The nutrient imbalance potentially leads to undesirable algae and weed growth in what may be a nutrient rich main water body 12.

In contrast, embodiments of the pond 100 taught herein induce a circulation flow in the main water body 12, such as by pumping water to the one or more primary semi-isolated treatment areas 102 for return to the main water body 12 via the one or more water conveyance elements 108. The combined operation of the at least one pump system 112, the one or more treatment area outlets 106 and the one or more water conveyance elements 108 enables recirculation flow through the one or more primary semi-isolated treatment areas 102, the one or more secondary treatment areas 101 and the main water body 12. Such recirculation flow through the one or more treatment areas 102 results in increased contact time between the water to be treated and the ecological communities that provide the desired water treatment functions.

By way of example, in embodiments where the one or more water conveyance elements 108 have a spill elevation slightly below that of the one or more treatment area outlets 106, the one or more water conveyance elements 108 are limited in ability to convey water. In this case, the at least one pump system 112 has a high flow operating mode for delivering a first flow rate of water, such as about 50 L/s, when the water level in the main water body 12 is above the pumped normal water level 118 and below the first gravity normal water level 24. The intention is to have at least a portion of the pumped flow leave the one or more primary semi-isolated treatment areas 102 via the one or more treatment area outlets 106.

When the at least one pump system 112 operate in the high flow mode, the one or more water conveyance elements 108 can be limited to conveying a limited flow rate of water, such as no more than about 10 L/s from the one or more primary semi-isolated treatment areas 102 to the main water body 12, thus leaving the remainder of the flow from the one or more pump system 12 to leave the one or more primary semi-isolated treatment areas 102 via the one or more treatment area outlets 106.

When the water level in the main water body 12 is drawn down to the pumped normal water level 118, the at least one pump system 112 can switch to a low flow operating mode wherein the one or more pumps deliver a second flow rate of water, such as only about 10 L/s, to the one or more primary semi-isolated treatment areas 102. The one or more water conveyance elements 108 would convey the entire flow generated by the at least one pump system 112 to the main water body 12 when the at least one pump system 112 operates under the low flow operating mode. Flow passing through the one or more water conveyance elements 108 induces a recirculation flow back to the one or more inflow pipes 114 for the at least one pump system 112 by way of passing over the one or more secondary treatment areas 101. The recirculation flow created thus has an opportunity to have nutrients and/or pathogens removed therefrom as the water passes through the ecological environments or communities in the one or more secondary treatment areas 101 on the way to the one or more inflow pipes 114 and as the water passes ecological communities located between the at least one pump system 112 and the one or more water conveyance elements 108 by way of the one or more primary semi-isolated treatment areas 102.

Whereas the example above describes a scenario wherein the system is controlled through the use of a high flow and a low flow mode for the at least one pump system 112, one of skill in the art would understand that the system could alternately be controlled by continuously or intermittently maintaining a single pump flow rate and actively manipulating a valve a gate or other such means of controlling flow at the one or more treatment area outlets 106, at the one or more water conveyance elements 108 or a combination thereof.

Having reference again to FIG. 4, a hypothetical temporal response of embodiments of the pond 100, to a discrete inflow event is shown. By way of example, the volume of water represented by the pumped outflow hydrograph 66 of FIG. 4, over the illustrated duration of pumped flow, represents 10,000 m³. The 10,000 m³, discharged according to the pumped outflow hydrograph 66 from the at least one drain pipe 22 over the duration of pumped flow, is the secondary water storage volume, as previously described.

If the response of pond 100, to each discrete inflow event, results in the ability to manage 10,000 m³ of the secondary water storage volume, a larger water volume can be cumulatively managed in this manner over the course of a year. Only ten discrete inflow events in a year, each delivering about 10,000 m³ of water to the pond 100 would result in the successful management of 100,000 m³ of water for a single pond 100. Most climatic regions around the world typically generate more than ten discrete inflow events annually to the pond 100. There are many benefits to the secondary water storage volume strategy including, but not limited to being able to supply a sustaining base flow of high quality water, such as during drought conditions, to downstream receiving water bodies including, but not limited to creeks, rivers and lakes.

Regarding system robustness and public safety, maintenance crews tend to be busiest responding to urgent infrastructure failures during or immediately after an extreme inflow event. In prior art ponds 10, the primary water storage volume is restored by gravity flow, not by pumping, since inflow events cause pump system failures through electrical system blackouts. If maintenance crews are otherwise occupied, a pump station intended to restore primary water storage volume may not receive prompt attention, leaving the pond system 100 and the public vulnerable to flooding damage.

In embodiments taught herein, the at least one pump system 112 is intended only to restore secondary water storage volume, which may not be critical storage. Primary water storage volume is restored by gravity flow past the one or more water level control elements 20. Failure of the at least one pump system 112 to function, due to power failure or some other mechanical failure, can be addressed at any time after maintenance crews have attended to other more urgent matters.

It is important to keep in mind that one of the great achievements of stormwater management designers to date is use of prior art ponds 10 to reduce, by an order of magnitude or more, the peak flow rate to a downstream stormwater trunk, as shown in the inflow hydrograph 60 and in the gravity outflow hydrograph 62 of FIG. 3.

In embodiments taught herein, the total water volume delivered to the pond 100 from an inflow hydrograph 60 is less than the available secondary water storage volume in which case there would not be a gravity outflow hydrograph 64 in response to the inflow event. In this case, peak flow rates associated with the pumped outflow hydrograph 66, shown in FIG. 4, could be another order of magnitude lower (i.e., 90% or more) when compared to the peak flow rate associated with the prior art gravity outflow hydrograph 62.

As noted previously, creeks or other natural conveyance systems that formerly provided drainage to natural landscapes have developed over time to be in a state of dynamic equilibrium with the runoff volumes and intensities generated by their natural catchment areas which are comprised of vegetation and absorbent soils that consume water and act to temporarily store, evapotranspire, infiltrate, or otherwise attenuate the peak runoff flow from the landscape. As urban environments expand in area, greater areas of former natural and vegetated lands are converted to impervious areas that result in considerable increases in both annual runoff volume and runoff flow intensity from the landscape. This results in creeks and other natural conveyance systems becoming exposed to higher peak flow rates and energy states than have historically been experienced, thus causing erosion and flooding that can expose the public to peril and can put adjacent lands and landowners at risk of property damage.

In embodiments taught herein, the very low pumped flow rates from the pond 100, such as between about 10 L/s to about 100 L/s depending upon the size of the pond 100, according to outflow hydrograph 66 (FIG. 4), provide extended flow rate attenuation storage that enables natural conveyance systems to convey much larger annual volumes than historically experienced without resulting in unacceptably high channel erosion dynamics and/or flooding and any associated collateral damage to landowners and the general public.

As described earlier, it has conventionally been deemed undesirable to use pumped systems to move large volumes of water quickly in an effort to restore the primary water storage volume of a pond.

In embodiments taught herein, the pond 100 has the primary water storage volume restored, according to outflow hydrograph 64, by gravity in hours or a few days and has secondary water storage volume restored, according to outflow hydrograph 66, over a period of up to a week or more through pumping using a very small pump system, typically in the range of about 1 to 2 horsepower. The about 1 or 2 horsepower pump system is very inexpensive to maintain, or completely replace if necessary, and has a low enough energy requirement that the pump could be operated using a solar power system with a battery.

If, for instance, the pond 100, as taught herein, were to cumulatively manage 100,000 m$^3$ of water annually through multiple cycles of filling and draining the secondary water storage volume and the at least one pump system 112 were to elevate the managed water an average of approximately 2 m from the main water body 12 to the one or more primary semi-isolated treatment areas 102, the total electrical energy requirements of attenuating 100,000 m$^3$ of water would cost about $100 or less, if electrical power is valued at $0.10/kWh. For perspective, a five horsepower pump or larger is typically used to power fountains in the middle of conventional ponds for aesthetic and aeration purposes. Thus, the cost of the at least one pump system 112 and annual electrical power cost to attenuate 100,000 m$^3$ of stormwater would be less than the overall pump system cost and annual electrical power cost of operating the fountains routinely placed in storm ponds.

It is worth noting that embodiments of the pond 100 taught herein, operating in a continuous or intermittent recirculation mode, would also aerate the water contained in the one or more secondary treatment areas 101 and the main water body 12. Furthermore, the at least one pump system 112 or the one or more water conveyance elements 108 could be designed to provide aesthetically pleasing flowing water in channels or in waterfalls to further enhance overall water aeration functionality.

Other advanced water management strategies become practical if embodiments taught herein are implemented with the intention of monitoring the water levels and using the pond 100 as a sophisticated drought and/or flood management asset. By monitoring both long and short term weather forecasts, the rules of operation of the at least one pump system 112 can be adapted as needed. If an extensive dry period is projected, what may be a pumping duration of 5 days for the at least one pump system 112, for example, could be stretched out to weeks or more to preserve precious base flow to creeks, streams or other sensitive downstream receiving environments. Operating modes could be initiated wherein the at least one pump system 112 draws the water level down below the pumped normal water level 118 to provide sustaining base flow to downstream environments over long periods of time. Alternatively, the at least one pump system 112 may be engaged to draw down the water level below the pumped normal water level 118 in advance of a major storm system predicted to reach the pond 100 days or a week or more in the future, thus proactively and contextually increasing the secondary water storage volume of the system.

Further, if embodiments taught herein are implemented throughout a regional municipal environment, spatial management of the distributed secondary water storage volume assets can be implemented as a storm passing over a large metropolitan area results in spatially variable rainfall resulting in spatially variable changes in available secondary water storage volume for each pond 100.

Embodiments of pond 100 are beneficial to communities for more than aesthetic reasons as they are likely to develop healthy and diverse ecological communities within the pond. Healthy ecological communities tend to develop healthy and diverse ecosystems where the presence of habitat, suitable for nuisance insects such as mosquitos, is balanced by the presence of habitat suitable for birds, dragonflies, and other organisms that consume the nuisance insects, their eggs and larvae. Furthermore, bacteria, fungi, and other microorganisms, present in and around healthy and diverse plant communities, play an important role in the breakdown and bioremediation of water-soluble or hydrocarbon based contaminants and inhibiting proliferation of waterborne pathogens.

Embodiments of the pond 100 have one or more primary semi-isolated treatment areas 102 located above and/or below the high water level 26 and one or more secondary treatment areas 101 located within the main water body 12.

Embodiments of the pond 100 have one or more main water bodies 12 and one or more pre-treatment water bodies 13, each with one or more inflow pipes 14.

Embodiments of the pond have the at least one pump system 112 discharging to one or more of the one or more primary semi-isolated treatment areas 102. Furthermore, one or more of the one or more primary semi-isolated treatment areas 102 may discharge from one or more water conveyance elements 108 to one or more of the remaining one or more primary semi-isolated treatment areas 102, or to the one or more main water bodies 12.

In embodiments of the pond 100, the one or more of the one or more treatment area outlets 106 from the one or more primary semi-isolated treatment areas 102 discharge to a location other than to one or more outlet control structures 18,124 for the purposes of supplying high quality source water produced therein for use in industrial, municipal or environmental uses that may include, but are not limited to irrigation, industrial process water, natural wetland sustaining flow, groundwater recharge, raw water supply to a potable water treatment system, and non-potable water supplies, such as purple pipe systems. Additional pumping or control systems required to support such uses of treated water beyond the at least one pump system 112 disclosed herein would be added as required.

The potential value that can be derived by an end user can be illustrated by way of example where 100,000 m$^3$ of safe non-potable water is produced by an embodiment over the course of a year and the annual cost to operate and maintain the embodiment is about $10,000. A large user of water, such as a regional concrete mixing plant, which may use more than 100,000 m$^3$ of water annually, is usually connected to the potable water supply system and thus usually pays for water to use in the concrete mixing process at the bulk supply rate which may be in the range of about $3/m$^3$. If the large water user is located close to an embodiment taught herein and could effectively carry out their business using non-potable water instead of potable water then the annual consumption of potable water could be reduced by 100,000 m$^3$ thus resulting in an annual operating cost reduction of almost $300,000.

In embodiments, one or more of the one or more primary semi-isolated treatment areas 102 discharge to one or more treatment area outlets 106 as shown in the embodiment shown in FIGS. 2A and 2B, FIGS. 2C and 2D, FIGS. 2E and 2F, or combinations thereof.

Secondary water storage volume can be designed to be similar to or even exceed the primary water storage volume. Such cases would enable most or all of the annual stormwater inflow volume delivered to the pond 100 according to multiple instances of the inflow hydrograph 60 to be managed without flow passing through the at least one outflow pipe 16. Primary water storage volume would, in this case, provide flood protection against the most extreme storm events.

Embodiments of the pond 100 taught herein can be constructed as new ponds or can be retrofit into existing ponds. Embodiments may also be constructed to provide enhanced treatment of contaminated baseflow in streams or creeks.

Further, in embodiments of the pond 100, the pre-treatment water body 13 may be configured according to the applicant's Nautilus Pond® system for capturing sediment, as taught in U.S. Pat. No. 8,333,895, the entirety of which is incorporated herein by reference. Further, one or more of the one or more primary semi-isolated treatment areas 102 or one or more of the one or more shallow areas 40 are configured as taught in U.S. Pat. No. 9,394,677, the entirety of which is incorporated herein by reference, for managing and transforming sediment deposited in the one or more pre-treatment water bodies 13 or in the main water body 12.

Embodiments of the pond 100 may be intended to provide support for natural wetland resources where urban development around a natural wetland diverts runoff into a pond 100, thus virtually eliminating runoff volumes to the natural wetland. Diverting urban runoff away from a natural wetland is necessary in principle to protect the natural wetland since the volume of runoff generated by the urbanized environment is much larger than the pre-development condition experienced by the natural wetland. Furthermore, direct runoff from urbanized lands contains sediment, nutrient and contaminant loads that are considerably different from the pre-development condition. Given that the former catchment of the natural wetland is simply delivering runoff to a pond 100, it makes sense from a hydrological perspective to enable use of some of the water delivered to the pond 100 to sustain the natural wetland.

Natural wetlands are not static systems, but instead receive varying amounts of water as the seasons change and are subject to variations in water input associated with longer time scale climatic trends. Unlike a pond 100 wherein the one or more primary semi-isolated treatment areas 102 are comprised of wetland plants to form a treatment wetland, and could be maintained at the second gravity normal water level 110 with little variation, it is understood that a natural wetland experiences a hydroperiod where seasonal variations in water input, temperature and sunshine result in water levels that may gradually trend upwards or downwards over the course of weeks and months. Embodiments of pond 100 can deliver water from one or more treatment area outlets 106 configured as may be deemed appropriate by one of skill in the art. However, the volume of water delivered to a natural wetland and the timing of water delivery should mimic the natural hydroperiod of the natural wetland.

Mimicking the natural hydroperiod of a natural wetland requires that water, approximately equivalent in volume to that which was delivered to the natural wetland prior to developing the land and constructing the pond 100 and delivered at a time within a few days or so to the occurrence of rainfall events, be delivered to appropriately support the biological functions in the natural wetland that have developed over time. Continuous or intermittent monitoring of water levels in the pond 100 and/or inflow water delivered thereto can enable an estimate of the volume of water delivered to the pond 100 from each storm event inflow hydrograph 60. A natural wetland maintenance "transfer coefficient" can be defined so that the amount of water that the natural wetland is "owed" (i.e. fraction of the inflow hydrograph 60 water volume received by the pond 100 that appropriately represents a pre-development runoff volume to the natural wetland from the community) can be delivered to the natural wetland. The transfer coefficient can initially be assigned but can be modified in the future if long term natural wetland monitoring suggests that the natural wetland may be receiving more than or less water than what may be expected. This process provides an automatic means for providing an appropriate volume of water to a natural wetland (i.e., more during wet years and less water during dry years) and appropriately timed delivery of water according to the timing of storm events.

There are scenarios whereby water owed to the natural wetland should not be delivered immediately after an inflow hydrograph 60 delivers water to a pond 100. For example, rain from a cloudburst on an otherwise hot and sunny day picks up heat from hot surfaces, such as asphalt roads, so that particularly warm runoff water may be delivered to the pond 100. A continuously or intermittently sampling water quality sonde can report a temperature exceedance alarm, according to a set of programmed control system rules, and decide to defer the automatic delivery of owed water to a natural wetland to a time when the delivery temperature is appropriate. A day or two of recirculating water through the main water body 12 and the one or more primary semi-isolated treatment areas 102 may be sufficient to bring the temperature of the water in the main water body 12 back into a normal range. In this example, the control systems would still track the volume of water that is owed to the natural wetland, but the system would refrain from automatically delivering treated water until it is appropriate to do so. Treated water may be discharged to the wetland in advance, if weather forecasting systems are used to predict storm events.

Some water quality nutrient parameters, such as phosphorous, cannot be continuously monitored using a water quality sonde and it is impractical to do lab testing of water samples prior to all water releases to a natural wetland. Immediately after a storm event, such nutrients spike in concentration, but the continuous or intermittent recirculation of water through the main water body 12 and the one or more primary semi-isolated treatment areas 102 are expected to gradually bring these water quality parameters back into a normal range that is appropriate for delivery to a natural wetland. For this reason, one of skill in the art may set control system rules whereby not only the continuously or intermittently monitored parameters must be within an acceptable range, but that water owed to the wetland will not be delivered until at least a set amount of time (i.e., perhaps one or two days) has passed since a storm event. Monitoring programs may be used to evaluate what a reasonable delay period should be for water quality parameters to return to a desirable target range.

Pre-delivery of treated water to the natural wetland prior to the arrival of a storm event can also be used to avoid an unnecessary and potentially lengthy delay in delivering treated water to the natural wetland.

We claim:

1. A system for treatment of water therein comprising:
  a main water body for collecting the water therein, the main water body having
    one or more inlets thereto for receiving an inflow of the water; and
    at least one gravity outlet for controlled drainage and discharge of the water therefrom for establishing a first gravity normal water level in the main water body;
  one or more primary semi-isolated treatment areas located within the main water body, each of the one or more primary semi-isolated treatment areas having an average bottom elevation higher than an average bottom elevation of the main water body, the one or more primary semi-isolated treatment areas having a second gravity normal water level;
  one or more ecological communities supported within the one or more primary semi-isolated treatment areas for treating the water flowing therethrough for beneficially affecting the quality of treated water therein;
  at least one pump system for continuously or intermittently pumping water between the main water body and the one or more primary semi-isolated treatment areas, for maintaining the water level therein at the second gravity normal water level; and
  one or more treatment area outlets fluidly connected to each of the one or more primary semi-isolated treatment areas for discharging the treated water therefrom, said one or more treatment area outlets fluidly connected to one or more filtration layers, said filtration layers configured to filter the treated water discharged from the outlets;
  wherein the pumping of water between the main water body and the discharging of water from the one or more primary semi-isolated treatment areas induces the flowing of the water through the one or more ecological communities;
  wherein the treated water is discharged from the one or more treatment area outlets of the one or more primary semi-isolated treatment areas for delivery downstream from the system.

2. The system of claim 1 wherein each of the one or more of the semi-isolated treatment areas further comprises:
  at least a partial containment barrier thereabout.

3. The system of claim 2, further comprising:
  one or more water conveyance elements extending between the main water body and each of the one or more primary semi-isolated treatment areas for fluidly connecting therebetween,
  wherein, the second gravity normal water level therein is maintained by the one or more treatment area outlets, the one or more water conveyance elements, the first gravity normal water level, the at least one pump system or combinations thereof.

4. The system of claim 3, wherein during inflow of water to the main water body, the one or more water conveyance elements act to equalize water levels in the main water body and each of the one or more primary semi-isolated treatment areas.

5. The system of claim 3 wherein at least a portion of the treated water is discharged from the one or more primary semi-isolated treatment areas through the one or more water conveyance elements for improving quality of the water in the main body.

6. The system of claim 3 wherein, when the one or more water conveyance elements discharge water from the one or more primary semi-isolated areas to the main water body, a recirculation flow is induced through the one or more secondary treatment areas and ecological communities therein, for treating the water in the main water body, flowing toward one or more inlets to the one or more pump systems.

7. The system of claim 1 wherein, between inflows of water to the main water body, the at least one pump system, when continuously or intermittently pumping water to the one or more primary semi-isolated treatment areas, lowers the water level in the main water body from the first gravity normal water level to a pumped normal water level, at least providing increased active storage capacity therein.

8. The system of claim 7 further comprising:
  one or more secondary treatment areas within the main water body, each of the one or more secondary treatment areas having an average bottom elevation higher than an average bottom elevation of the main water body, the one or more secondary treatment areas being exposed to water levels between the first gravity normal water level and the pumped normal water level for supporting ecological communities therein.

9. The system of claim 8, wherein, when the main water body is at the pumped normal water level, at least a portion of at least one of the one or more secondary treatment areas has a depth of less than about 0.5 m.

10. The system of claim 9 wherein, when the main water body is at the pumped normal water level, at least a portion of at least one of the one or more secondary treatment areas is not submerged in water.

11. The system of claim 1 wherein, when the one or more primary semi-isolated treatment areas are at the second gravity normal water level, at least a portion of at least one of the one or more primary semi-isolated treatment areas is not submerged in water.

12. The system of claim 1 further comprising:
  one or more pre-treatment areas having at least one of the one or more inlets for receiving the inflow of water therein, the one or more pre-treatment areas being fluidly connected to the main water body for discharging the water thereto,
  wherein between inflows of water thereto, the pretreatment area has a pre-treatment gravity normal water level therein.

13. The system of claim 12, wherein the pre-treatment area comprises:
  at least a partial pre-treatment containment barrier thereabout; and
  one or more flow conveyance outlets for fluidly connecting the pre-treatment area with the main water body for discharge of water therefrom to the main water body.

14. The system of claim 1 wherein said one or more filtration layers comprises granular media.

15. The system of claim 14 wherein the treatment area outlet provides for primarily vertical flow of treated water through the granular media.

16. A method for treatment of water within a main water body comprises:
  semi-isolating one or more primary treatment areas of the main water body, the one or more primary semi-isolated treatment areas having an average bottom elevation higher than an average bottom elevation of the main water body;
  establishing ecological communities within the one or more primary semi-isolated treatment areas;

pumping water continuously or intermittently between the main water body and the one or more primary semi-isolated treatment areas;

discharging a portion of the treated water from the one or more primary semi-isolated treatment areas through one or more treatment area outlets for delivery downstream from the system, and filtering the portion of the treated water discharging from the one or more primary semi-isolated treatment areas, wherein the pumping and discharging steps induce a flow of at least a portion of the water in the main water body through the ecological communities in the primary semi-isolated treatment areas for treating the water flowing therethrough.

17. The method of claim 16, wherein the main water body has a first gravity normal water level therein and the one or more primary semi-isolated treatment areas have a second gravity normal water level therein, further comprising:

continuing the pumping of water between the main water body and the one or more primary semi-isolated treatment areas for maintaining the second gravity normal water level therein.

18. The method of claim 17 wherein the pumping water from the main water body to the one or more primary semi-isolated treatment areas lowers the first gravity normal water level to a pumped normal water level.

19. The method of claim 16 further comprising:

varying a topography of a bottom of the one or more primary semi-isolated treatment areas for supporting a diversity within the one or more ecological communities therein.

20. The method of claim 16 further comprising:

raising an average elevation of a bottom of the main water body for forming one or more secondary treatment areas therein, the one or more secondary treatment areas having the first gravity normal water level; and establishing ecological communities in the one or more secondary treatment areas.

21. The method of claim 20 wherein a depth of the water over the one or more secondary treatment areas at the pumped normal water level is capable of supporting the ecological communities therein.

22. The method of claim 20 further comprising:

discharging at least a portion of the treated water from the one or more primary semi-isolated treatment areas to the main water body for recirculation through the one or more secondary treatment areas and ecological communities therein.

23. The method of claim 22 further comprising:

actively or passively controlling the discharging of the at least a portion of the treated water from the one or more primary semi-isolated treatment areas to the main water body.

24. The method of claim 16 further comprising:

actively or passively controlling the discharging of the treated water from the system.

25. The method of claim 16 wherein said one or more filtration layers comprises granular media.

26. The method of claim 25 wherein the filtering of the portion of the treated water is by primarily vertical flow of the portion of the treated water through the granular media.

* * * * *